No. 647,739. Patented Apr. 17, 1900.
J. BARRETT.
SEWER TRAP AND ITS CONNECTION AND EQUIPMENT.
(Application filed Sept. 9, 1899.)
(No Model.)
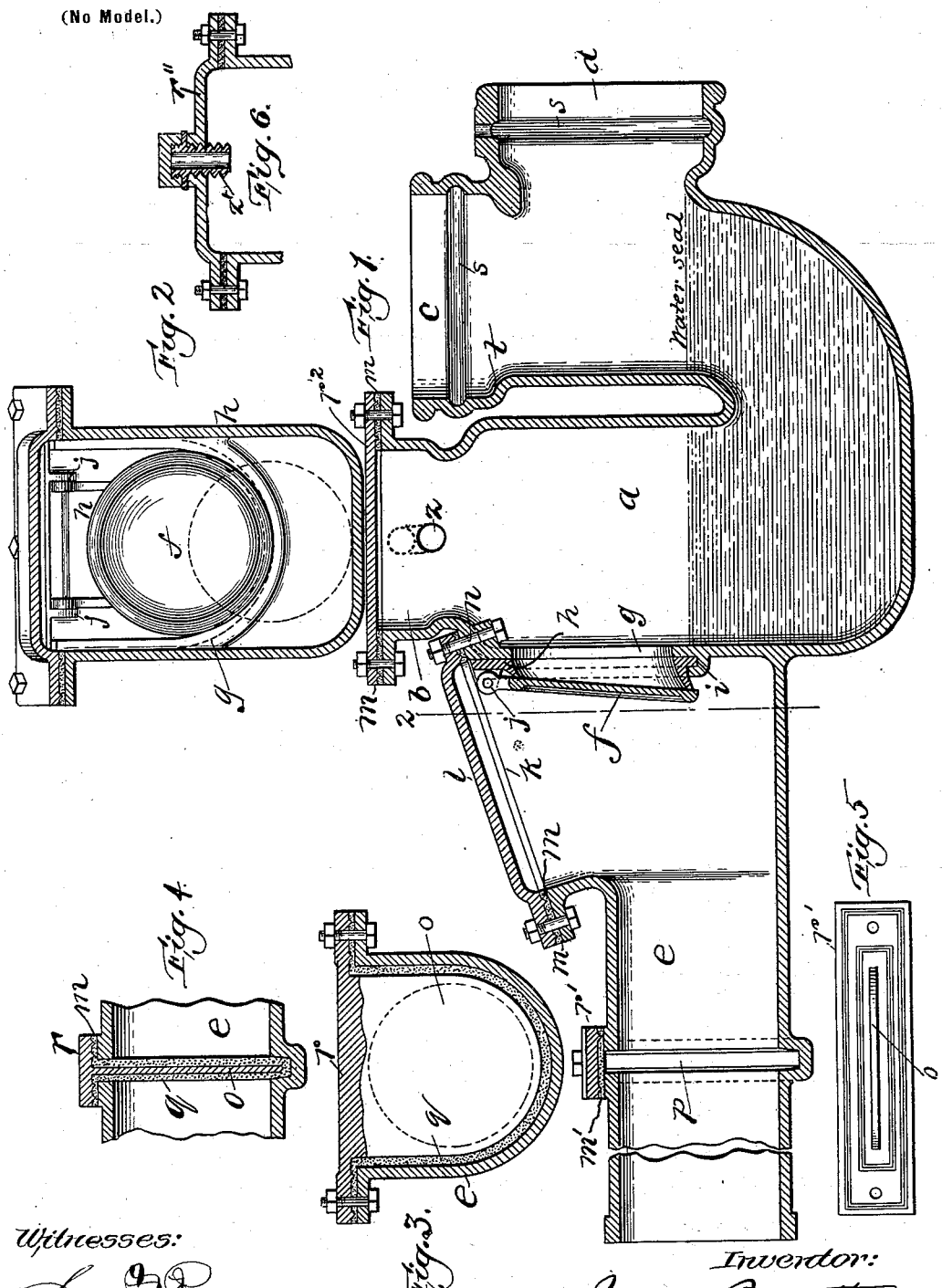
Witnesses:
Arthur J. Randall.
Roy K. Hill.
Inventor:
James Barrett.
by Crosley and Davis.
Attorneys.

UNITED STATES PATENT OFFICE.

JAMES BARRETT, OF BOSTON, MASSACHUSETTS.

SEWER-TRAP AND ITS CONNECTION AND EQUIPMENT.

SPECIFICATION forming part of Letters Patent No. 647,739, dated April 17, 1900.

Application filed September 9, 1899. Serial No. 730,014. (No model.)

*To all whom it may concern:*

Be it known that I, JAMES BARRETT, of Boston, in the county of Suffolk and State of Massachusetts, have invented certain new and useful Improvements in Sewer-Traps and their Connections and Equipments, of which the following is a description sufficiently full, clear, and exact to enable those skilled in the art to which it appertains or with which it is most nearly connected to make and use the same.

This invention relates to sewer-traps usually included within the bounds of the walls of a dwelling, though some features, if not all, may be employed in other places and connections.

It is the object of this invention to provide improved means for temporarily sealing the sewage and waste-water system of a dwelling from the sewer outside when it is desired to test the pipes or system inside or for other reasons, the sealing-gate being at other times removed, so as to allow of the free flow of water through the pipes.

It is also the object of the invention to provide improved means for supporting the part of the trap to which the gate or valve is hinged, so as to secure a greater readiness of adjustment and removal of parts and other advantages.

The invention consists of the improvements hereinafter more fully and particularly pointed out.

Reference is to be had to the annexed drawings, and to the letters marked thereon, forming a part of this specification, the same letters designating the same parts or features, as the case may be, wherever they occur.

Of the drawings, Figure 1 is a longitudinal central sectional view of half of a sewer-trap embodying my improvements. Fig. 2 is a transverse sectional view taken on the line 2 2 of Fig. 1 looking toward the gate or valve of the trap. Fig. 3 is a cross-sectional view taken through the gate and its sealing means, whereby communication with the sewer outside and the pipe system inside is or may be cut off. Fig. 4 is a transverse sectional view of the same. Fig. 5 is a bottom plan view of the cap which covers the gate or slot for the reception of the gate for cutting off the communication between the outside and the sewer-trap inside, and Fig. 6 illustrates in section a modified construction of cap or cover and water connection.

In the drawings, $a$ designates the body of the trap, which is provided with a clean-out aperture or port $b$, a fresh-air vent $c$, and a water or sewer port $d$, as also a section of pipe $e$, leading to the sewer outside.

The reference-letter $f$ designates a gate or valve which controls a port $g$, through which the sewage or water flows from the trap proper, $a$, to the pipe $e$. The side walls of the latter where they join the body $a$ are provided with slideways for the reception from above of a frame $h$—i. e., so that the frame $h$ may be entered from above and slid down in the grooves formed in the sides or walls of the trap to its seat $i$, which is in the form of a flange projecting outwardly from the partition between the body $a$ and pipe $e$ just below the port $g$ and having an inturned portion to take over the frame $h$. The gate $f$ is hinged at its upper edge or part, as at $j$, to the frame $h$, as shown in Figs. 1 and 2, and said frame has an inclined seat for said gate to close against.

$k$ designates the hand-hole, through which access is had to the gate, so as to in some respects assist in the clean out, the frame $h$, with the gate, being removable and insertible through said hand-hole. This hand-hole is closed by means of a cover $l$, which is secured in place by means of bolts and nuts passing through the margin of the cover and a flange-part of the sewer-trap, as shown, a packing $m$ intervening between the cover and the flanges of the trap. By securing the support for the gate $f$ in place, as described, I am enabled to do the work with less liability of breakage and in a more economical manner and at the same time employ nuts and bolts, as at $n$, to hold the upper edge of the cover $l$ in place, a thing that was not feasible heretofore because of the manner in which the hinges of the gate $f$ were connected with the walls of the trap, which prevented the employment of the bolts $n$ at exactly the desired points in order to secure the cover $l$ firmly in place.

$o$ designates a cut-off gate or slide which is adapted to be moved down into place in grooves or guideways $p$, formed in the pipe $e$.

When the trap is in use and it is desired that there should be a free flow of the sewage through the pipe, the gate will be removed and the slot above the grooves or guideways $p$ will be closed by means of a cover $r'$ and packing $m'$, secured in place, as shown. When, however, it is desired to cut off in an air-tight manner the pipe $e$ from the sewage system outside, the gate $o$, with a packing $q$ surrounding the same, will be forced down into position, as shown in Fig. 1, and a cover $r$, as a flange of the gate, secured in place thereover, with packing $m$ interposed, as shown. To insure an absolutely close joint or gas-tight connection between the pipe and the cover, through the medium of the packing $m$, I provide the under face of the cover with ribs having a V shape in cross-section, so that their angular edges will take into or be pressed down in the packing $m$, as shown, making it impossible for gas to escape between the cover and the packing. This provision on the cover $r$ is likewise employed upon the covers $l\ r'$, as well as the cover $r^2$, for the clean-out $b$, and it may be employed at other points or in other connections in the construction and adjustment of covers for the apertures of sewage systems.

Where pipes are to be connected with the sewer, as with fresh-air-vent aperture $c$ and the water-port $d$, I provide the trap with an annular rounded groove $s$, so that after the connecting-pipe is fitted into the port or aperture to its seat—say at $t$—sealing lead may be poured into the groove $s$ between the connecting-pipe and the trap, and so effect a more complete sealing of the connecting-pipe with the trap. This mode of connecting the pipe with the trap I have ascertained by experience is much more efficient than that of tamping the lead in between the connecting-pipe and the trap in such space as may be afforded by the variation in the diameters of the two. In addition to this relatively very little lead is necessary to secure the joint connection of the pipe with the trap, and, again, the work can be quickly done.

It is to be particularly noted that the provision of the cut-off gate $p$ is merely for the event of cutting off the sewage system from the street with that of the house while the latter is being tested. At other times the gate will be removed to keep the pipe $e$ open. It would not, however, be without the scope of my improvements to employ the gate $p$ for other purposes.

The usual method heretofore in cutting off street-mains from the house system has been through the medium of a Y or through the manhole $b$, when the pipe $e$ was stopped by means of bricks and cement, such as plaster-of-paris, which when it becomes "set" or hardens is difficult of removal and often occasions a breakage of the pipes. All this is avoided by my improvements.

In order to provide for efficient means for admitting water into the pipe system of the house when testing the sewer system of the house, I may provide the hub or projection leading to the clean-out $b$ with a projecting Y branch $z$, which is covered with an airtight cap when the Y branch is not in use. I prefer, however, to employ the nipple $z'$, screwing into a boss in the cover $r'$, as shown in Fig. 6, and screw-threaded to receive a cap or a hose-coupling when a water connection is to be effected for testing purposes.

The gate $f$ acts automatically to prevent the backflow of water from the street sewage system into the dwelling.

Having thus explained the nature of the invention and described a way of constructing and using the same, though without attempting to set forth all of the forms in which it may be made or all of the modes of its use, it is declared that what is claimed is—

1. In an apparatus of the character described, a conduit whose walls have slideways extending from the ends of a transverse opening in one side of the conduit; and a cut-off gate constructed to pass through said opening into engagement with said slideways, said gate having integral with it a cover for the opening.

2. In an apparatus of the character described, a conduit whose walls have slideways extending from the ends of a transverse opening through one side of the conduit, the latter being flanged for attachment of a cover for said opening; and a cut-off gate constructed to pass through said opening into engagement with said slideways, said gate being flanged to form a cover for the opening, constructed to be clamped to the flanged portion of the conduit.

3. A sewer-trap provided with grooves in its wall at a point surrounding an outlet-port, in combination with a one-piece frame adapted to be received in said grooves and having a valve-seat, and a gate-valve for controlling the outlet-port said gate-valve being hinged over said seat to one and the same frame as that having the valve-seat.

4. A sewer-trap comprising in its construction the trap proper having an outlet-pipe springing from a vertical wall thereof and vertically grooved in its sides adjacent to said wall of the trap, the latter having an opening or port by which the trap communicates with the pipe and also having a seat formed on its outer side just below said opening; a sliding frame engaging the grooves of the outlet-pipe and the seat on the wall of the trap, said frame being apertured to register with the opening in said trap-wall and having an inclined valve-seat; and a gate or valve hinged to the said frame so as to rest against said inclined seat; that portion of the outlet-pipe containing said frame and gate being of open-top construction and having a removable cover, substantially as described.

5. The combination with a conduit formed at its outlet with a projecting flange portion which is formed with an inwardly-turned portion, of a valve-frame comprising a removable plate fitting within said inwardly-turned portion and having an opening registering with the end of the pipe and an inclined valve-seat projecting from said plate, and a check-valve hinged at its upper end to said plate.

In testimony whereof I have signed my name to this specification, in the presence of two subscribing witnesses, this 1st day of September, A. D. 1899.

JAMES BARRETT.

Witnesses:
ARTHUR W. CROSSLEY,
F. P. DAVIS.